UNITED STATES PATENT OFFICE.

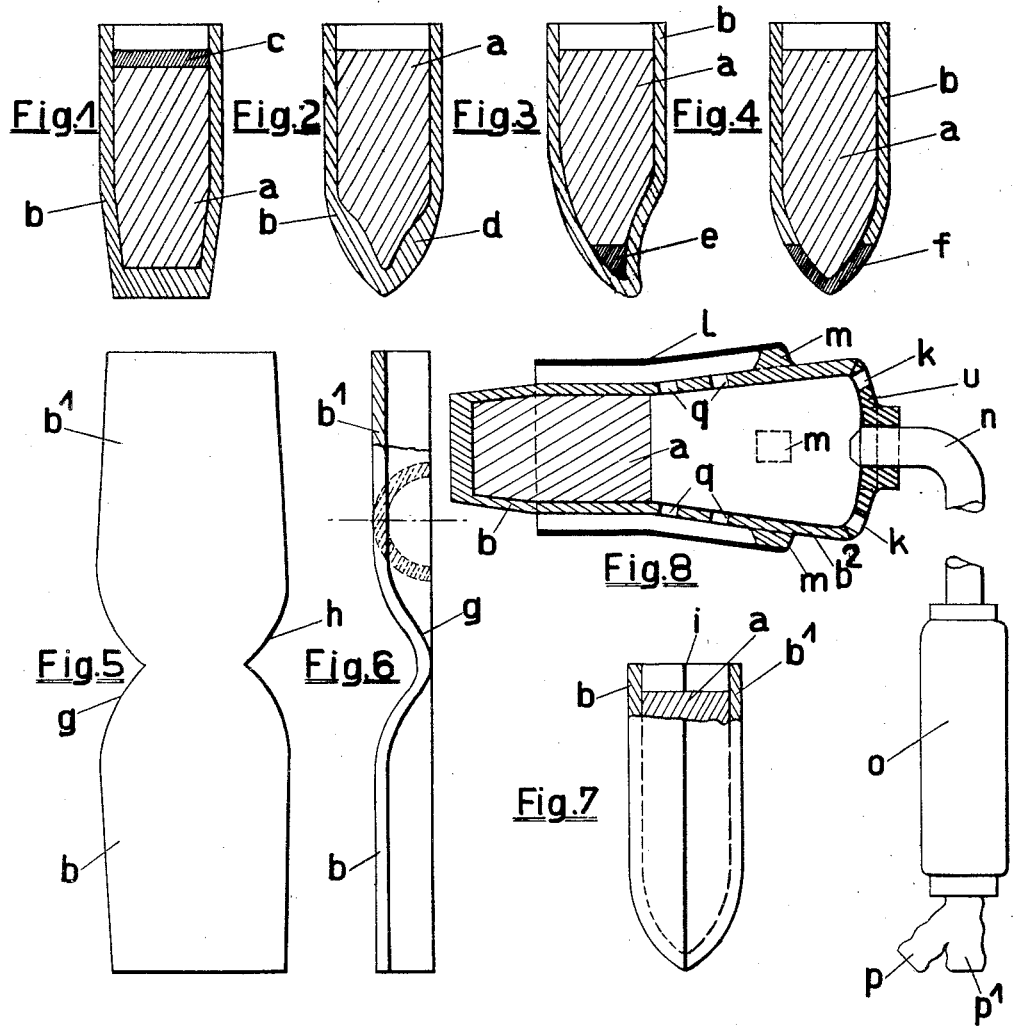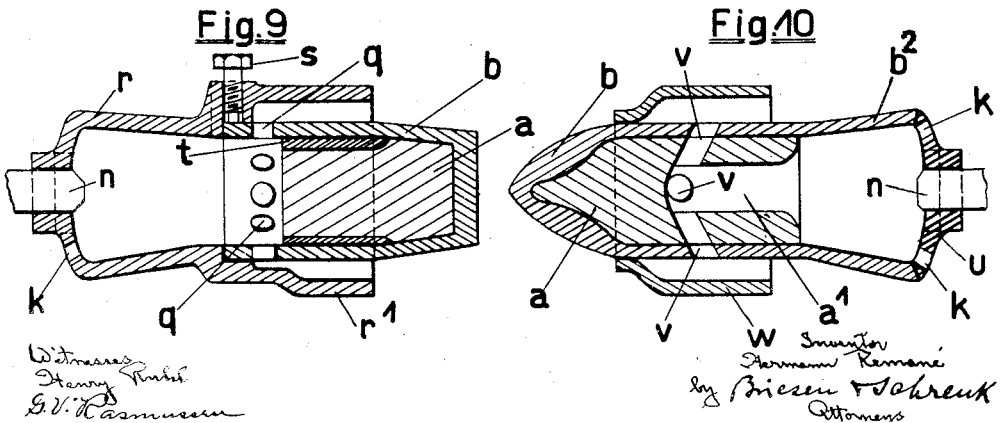

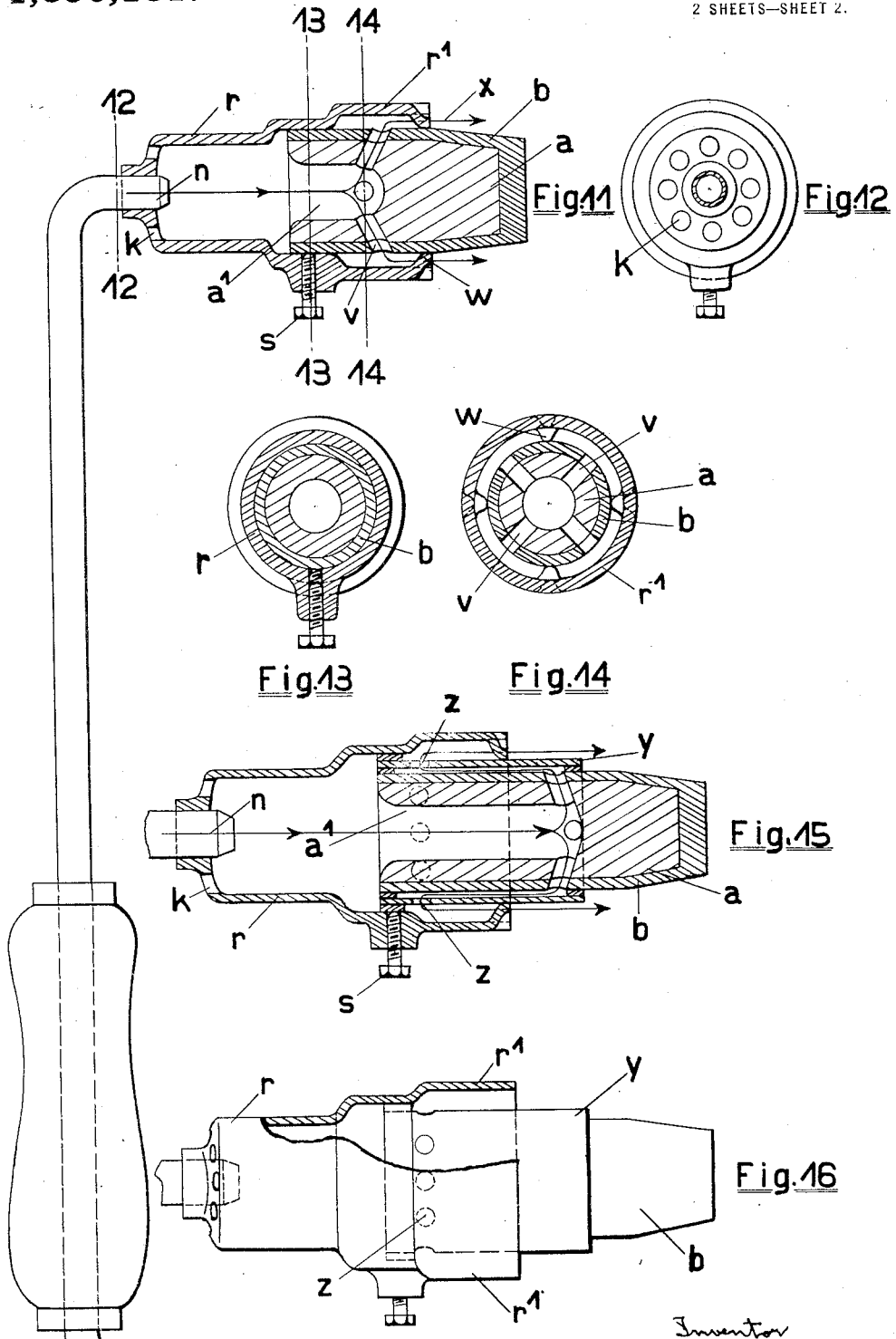

HERMANN REMANÉ, OF BERLIN, GERMANY.

SOLDERING-IRON.

1,350,181.  Specification of Letters Patent.  Patented Aug. 17, 1920.

Application filed April 24, 1918. Serial No. 230,584.

*To all whom it may concern:*

Be it known that I, HERMANN REMANÉ, a citizen of the Empire of Germany, and resident of Berlin, Germany, have invented certain new and useful Improvements in Soldering-Irons, of which the following is a specification.

My invention has for its object the creation of a new and useful improved soldering-iron, in which a very good heating especially of the pointed soldering end is realized and in which the soldering fluid is prevented from acting in an unfavorable and destructive manner upon the soldering-iron. Furthermore my invention comprises an advantageous process whereby such an improved soldering-iron may be manufactured in a simple and cheap manner. Another object of my invention consists in applying the new construction of a soldering-iron to the type of irons which are heated by a gaseous or liquid fuel.

In the accompanying drawings Figure 1 is a longitudinal section taken through a soldering-iron according to my invention. Figs. 2, 3 and 4 show various modifications of the construction illustrated by Fig. 1. Figs. 5, 6 and 7 represent the different steps of a process for manufacturing the new soldering-iron. Fig. 8 shows a soldering-iron heated by gaseous fuel constructed according to my invention. Figs. 9 to 16 give modifications of the construction shown by Fig. 8.

According to Fig. 1 the new soldering-iron comprises an outer mantle $b$ of iron or of another metal which does not readily oxidize in the flame and an inner core $a$ of copper or of another metal which is a good conductor of heat. The mantle $b$ of iron has for instance a cylindrical form pointed at the one end and may be made of cast-iron or of wrought-iron. An intimate connection of the mantle $b$ with the core $a$ can be obtained by soldering or welding on applying eventually an intermediate layer of a substance facilitating such a connection so as to insure a transmission of heat as perfect as possible from the core to the mantle. The copper of the core $a$ is introduced in the mantle $b$ by casting and is then covered at its rear end by means of a closing piece $c$ preferably of iron.

In order to prevent a too rapid wear of the pointed end of the mantle which receives the soldering fluid, the wall of the iron-mantle can be made, as shown in Fig. 2, thicker at this end $d$ than at the cylindrical part for instance by upsetting to a suitable degree the mantle when made of wrought-iron or by augmenting correspondingly the thickness of the wall in the case of cast-iron mantle.

If the inner space of the pointed end of the mantle is very narrow, the possibility exists that the molten copper will not flow in completely so that the conducting of heat from copper to iron is very bad even at that part of the mantle serving for soldering. In this event it is advantageous, as shown for instance in Fig. 3, to first introduce into the end of the iron-mantle an alloy $e$ having a lower melting point than the copper but also being a good heat conductor and then to infuse the copper core $a$. Before introducing the alloy and the copper the inner surface of the iron-mantle may be covered with a layer of borax and coated with a fusible alloy of brass after having removed all the oxid from the interior of the mantle. The alloy $e$ comprising for instance copper and silver or brass and silver may be introduced in the form of little pieces, which are melted by heating the end of the mantle to a suitable temperature and fill up the fine gap at the end of the mantle.

Fig. 4 shows another arrangement whereby the core is caused to perfectly fill the end of the mantle. According to Fig. 4 the mantle $b$ of cast-iron is provided with a pointed end $f$ of wrought-iron, which is welded to the mantle $b$. This separate end piece $f$ can be easily enlarged so as to permit a good and perfect infusing of the copper.

The mantle of the new soldering-iron can be fabricated by drawing an iron-plate into the desired form, whereby a wall of uniform thickness and a smooth inner surface are obtained. If the mantle is made of cast-iron, it is advantageous to remove the carbon from the iron at the end receiving the soldering material, while the other part of the mantle remains unaltered. For this purpose the soldering end of the cast-iron mantle is placed in a tempering mass and the remaining part of the mantle is surrounded with a material, for instance loam, whereby the oxid is retained from the iron. The tempering is effected only superficially so that the decarbonization does not advance in the iron.

Another method whereby the mantle may be fabricated consists in pressing it from an iron sheet in the manner illustrated by Figs. 5 to 7. First the iron sheet is stamped in the form shown in Fig. 5 which corresponds to a mantle halved and spread out and consequently comprises two equal parts $b$ and $b^1$ with lacings $g$ and $h$. This iron-sheet is then brought into the form shown for instance in Fig. 6 by bending upward the sides of the halves $b$ and $b^1$ and raising the middle part $g$, $h$, whereafter the two halves $b$ and $b^1$ are bent upward so as to produce the mantle shown in Fig. 7. Finally the butt joints are welded together and the copper of the core $a$ is melted into the mantle thus formed.

Fig. 8 represents a soldering-iron heated by a gas flame and constructed according to my invention. In this case the iron-mantle $b$ which receives the copper core $a$ has an elongated portion $b^2$ forming the combustion chamber and closed by an end cover $u$. The portion $b^2$ may have a cylindrical or conical form. The gas admitting tube $n$ enters the combustion chamber $b^2$ through the cover $u$ and carries the handle $o$ of the soldering-iron. The end of the tube $n$ is divided into two pipes $p$ and $p^1$ which are connected with two flexible tubes not shown, admitting gas and air respectively. A wall $l$ for instance of sheet-iron surrounds the mantle $b$, $b^2$ at a predetermined distance, the sheet-iron being fixed upon noses $m$ arranged on the elongated mantle portion $b^2$. The end cover $u$ is provided with openings $k$ whereby air is admitted to the combustion chamber $b^2$. Orifices $q$ are located in the side wall of the chamber $b^2$ so that the flame coming from the gas tube $n$ not only touches and heats the back of the copper core $a$ but also may pass in part through the orifices $q$ into contact with the outer side of the mantle $b$, these escaping flame jets being directed by the surrounding wall $l$ toward the pointed end of the iron mantle. Consequently this end is heated on the one hand indirectly by the copper core working as a heat-conductor and on the other hand directly by the flame jets leaving the combustion chamber.

The embodiment of my invention shown in Fig. 9 is distinguished from the construction illustrated by Fig. 8 in that the combustion chamber is constituted by a separate piece $r$, in which the iron mantle $b$ containing the copper core $a$ is fixed by means of a screw $s$ so as to be easily removable for exchanging purposes. The chamber $r$ carries an elongation $r^1$ which surrounds the iron mantle $b$ at a predetermined distance and corresponds to the wall $l$ of Fig. 8. The orifices $q$ provided in the back of the mantle $b$ permit the flame coming from the gas tube $n$ to pass to the outer side of the mantle. In order to augment the heat conducting action of the copper core $a$, a layer $t$ of a heat insulating material may be inserted between the iron-mantle $b$ and the copper core $a$ at such a length that only at the pointed end of the mantle, which is the operative part during soldering is there an intimate and direct contact between iron and copper. The insulating layer can be obtained by purifying and covering with brass the interior of the mantle only at the pointed end, while the other part of the interior is covered with a thin layer of clay or porcelain.

As shown in Fig. 10 the copper core filling the iron mantle can be modified so as to form a part of the combustion chamber of a soldering-iron heated by gaseous fuel. In this case the copper core $a$ is provided at its rear end with a bore-hole $a^1$ which communicates with the elongated portion $b^2$ of the mantle $b$ forming the combustion chamber. At the bottom of the bore-hole $a^1$ channels $v$ are arranged through which the flame coming from the gas tube $a$ and entering the bore-hole $a^1$ can escape to the outer side of the mantle $b$, $b^2$. The escaping flame-jets are directed toward the rear end of the mantle by means of a cylindrical wall $w$ for instance of sheet-iron surrounding the mantle at a certain distance and connected therewith at its one end. The elongation $b^2$ is closed by a cover $u$ provided with air admitting openings $k$.

If desired the inner copper core such as illustrated in a soldering-iron shown in Fig. 9 may also be provided with a bore-hole at its rear end so as to form a part of the combustion chamber. Such an embodiment of my invention is illustrated by the Figs. 11 to 14. According to Fig. 11 the iron mantle $b$ contains a copper core $a$, which shows a bore-hole $a^1$ communicating with the combustion chamber formed in the cylindrical hollow piece $r$. At the bottom of the bore-hole $a^1$ the channels $v$ are arranged whereby the combustion chamber is placed in communication with the annular space between the elongated wall $r^1$ of the piece $r$ and the mantle $b$. The flame coming from the gas tube $n$ enters the bore-hole $a^1$ and penetrates through the channels $v$ to the outer side of the mantle $b$ as indicated by the arrows $x$ so as to heat the soldering-iron on the inside as well as on the outside. The cylindrical piece $r$ is provided at its rear end with air admitting openings $k$, as shown by Fig. 12, which illustrates a transverse section through the soldering-iron, on the line 12, 12 of Fig. 11. Figs. 13 and 14 represent transverse sections of the apparatus on the lines 13, 13 and 14, 14 of Fig. 11 respectively and show especially the screws whereby the mantle $b$ is fixed in the cylindrical piece $r$ and the arrangement of the channels $v$ in the mantle $b$ and the core $a$. The mantle $b$ is displaceable in the cylindrical piece $r$ and is guided by noses $w$ provided on the elongated wall $r^1$.

The Figs. 15 and 16 illustrate a further arrangement whereby my invention may be utilized in connection with a gas heated soldering-iron, Fig. 15 being a longitudinal section and Fig. 16 a lateral view of the apparatus. According to Fig. 15 the mantle $b$ including the core $a$ is surrounded at a distance by a wall $y$ for instance of sheet-iron, which is fixed at its ends to the mantle $b$ and provided with openings $z$ arranged—see Fig. 16—toward the rear end of the mantle $b$. The core $a$ has a bore-hole $a^1$ at the bottom of which the channels $v$ are situated. The soldering-iron $a$, $b$, $y$ thus obtained is placed in the cylindrical piece $r$ and fixed therein by means of the screw $s$. The cylindrical piece $r$ carries an elongated portion $r^1$ surrounding at a distance the wall $y$ fixed on the mantle $b$. The flame-jet coming from the gas tube $n$ enters the bore-hole $a^1$, escapes through the channels $v$, passes through the annular space formed between the mantle $b$ and the surrounding wall $y$ penetrates through the openings $z$ into the annular space formed between the elongation $r^1$ and the wall $y$ and finally reaches the front end of the mantle $b$. In this manner a very efficacious heating of the soldering-iron is effected by causing the flame to take a long double reversing or tortuous path, as indicated by the arrows $x$, so as to touch on the one hand the interior of the core $a$ at a great length and on the other hand the outside of the mantle $b$ as well as of the wall $y$.

Having now described and ascertained the nature of my said invention I declare what I claim and desire to secure by Letters Patent is:

1. A soldering iron comprising an outer recessed mantle composed of a metal not readily oxidizable in a flame and constituting the soldering surface and an inner core located within the recess of said mantle and operatively combined therewith, said inner core consisting of a metal which is a good conductor of heat.

2. A soldering iron comprising an outer hollow mantle having a pointed end and composed of a metal not readily oxidizable in a flame, said mantle having a relatively thicker wall at said pointed end constituting the soldering surface, and an inner core located within said hollow mantle and consisting of a metal which is a good conductor of heat.

3. A soldering-iron, in which a core of a metal which is a good heat conductor is surrounded by a mantle of a metal which is not readily oxidized under the action of the flame, the pointed end of the mantle being filled with an alloy having a lower melting point than the rest of the core but being also a good heat conductor.

4. A soldering-iron, which is constituted by an inner core of copper and an outer mantle of cast-iron, the pointed end of said mantle being of wrought-iron and welded to the cast-iron of the mantle.

5. A soldering-iron comprising in combination an inner core of a metal which is a good heat conductor, an outer mantle of iron forming the soldering surface and surrounding said core, a combustion chamber constituted by an elongated portion of said iron-mantle and a gas admitting tube entering said chamber.

6. A soldering-iron comprising an inner core of a metal which is a good heat conductor, an outer mantle of iron forming the soldering surface and surrounding said core, a combustion chamber constituted by an elongation of said mantle, a wall of sheet-iron surrounding said mantle and said chamber at a certain distance, openings provided in said elongation of said mantle opposite said surrounding wall, a gas admitting tube entering said chamber and a handle fixed on said tube.

7. A soldering-iron comprising in combination an inner core of a metal which is a good heat-conductor, an outer mantle forming a soldering surface and consisting of a metal not readily oxidizable in the flame, a hollow body forming a combustion chamber, means for fixing said mantle in said hollow body, a gas admitting pipe entering said hollow body.

8. A soldering-iron comprising in combination an inner core of copper, a surrounding mantle of iron forming a soldering surface, a hollow body forming a combustion chamber and receiving the end of said mantle, means for fixing said mantle in said hollow body, a wall surrounding said mantle at a certain distance and constituted by an elongation of said hollow body, openings provided in the rear end of said mantle and communicating with the space between said mantle and said surrounding wall, and a gas admitting tube entering said combustion chamber.

9. A soldering-iron heated by gaseous fuel, which comprises in combination an outer mantle of iron constituting the soldering surface, an inner core of copper filling said mantle and provided at its rear end with a bore-hole, a combustion chamber formed by an elongation of said mantle, a wall surrounding said mantle at a distance and fixed thereto at one end, channels provided in said core and said mantle so as to connect said chamber and the space between said surrounding wall and said mantle, a gas inlet tube entering said combustion chamber and a handle fixed to said gas tube.

10. A soldering-iron heated by gaseous fuel, which comprises in combination an inner core of copper, an outer mantle of iron surrounding said core so as to constitute the soldering surface, a heat insulating layer inserted between said mantle and said core to such a length that said core touches said mantle directly only at its pointed end.

11. A soldering-iron, which comprises an inner core of a metal which is a good heat-conductor and an outer mantle of cast-iron constituting the soldering surface the pointed end of said mantle being decarbonized superficially.

12. In a soldering-iron heated by gaseous fuel in combination an outer mantle of iron constituting the soldering surface, an inner core of copper filling said mantle and provided with a bore-hole extending from its rear end, a hollow cylindrical piece forming the combustion chamber, means for fixing detachably said mantle in said cylindrical hollow piece, channels provided in said core and said mantle at the bottom of said bore-hole, a wall surrounding said mantle at a distance and constituted by an elongation of said hollow piece, a gas tube entering said combustion chamber, air admitting openings provided in the rear end of said hollow piece and a handle fixed to said gas tube.

13. A soldering-iron heated by gaseous fuel which comprises in combination an outer mantle of iron constituting the soldering surface, an inner core of copper provided with a bore-hole extending from its rear end, channels arranged at the bottom of said bore-hole and penetrating said core and said mantle, an outer wall surrounding said mantle at a distance and fixed thereto at both its ends, openings provided in said surrounding wall at the rear end of said mantle, a hollow piece constituting the combustion chamber, means for fixing said wall together with said mantle in said hollow piece, an elongated portion combined with said hollow piece and surrounding at a distance said wall fixed to said mantle, a gas tube entering said combustion chamber, air admitting openings provided at the rear end of said hollow piece and a handle fixed on said tube.

In testimony whereof, I have hereunto set my hand.

HERMANN REMANÉ.